(12) United States Patent
Jaradi et al.

(10) Patent No.: US 11,358,554 B1
(45) Date of Patent: Jun. 14, 2022

(54) AIRBAG ASSEMBLY INFLATABLE FROM SEATBACK

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/182,283

(22) Filed: Feb. 23, 2021

(51) Int. Cl.
*B60R 21/207* (2006.01)
*B60R 21/01* (2006.01)
*B60R 21/231* (2011.01)

(52) U.S. Cl.
CPC ............ *B60R 21/207* (2013.01); *B60R 21/01* (2013.01); *B60R 21/231* (2013.01); *B60R 2021/01286* (2013.01); *B60R 2021/23107* (2013.01); *B60R 2021/23161* (2013.01)

(58) Field of Classification Search
CPC ..... B60R 21/207; B60R 21/01; B60R 21/231; B60R 2021/01286; B60R 2021/23107; B60R 2021/23161; B60R 2021/21518; B60R 2021/23153; B60R 2021/23146; B60R 2021/2074
See application file for complete search history.

(56) References Cited

U.S. PATENT DOCUMENTS

| | | | |
|---|---|---|---|
| 3,397,911 A * | 8/1968 | Brosius, Sr. ........... | B60N 2/888 297/216.12 |
| 5,505,487 A * | 4/1996 | Brown .................. | B60R 21/207 280/730.1 |
| 6,030,036 A * | 2/2000 | Fohl ...................... | B60R 21/207 297/216.14 |
| 6,199,900 B1 * | 3/2001 | Zeigler ................. | B60R 21/207 280/735 |
| 7,588,115 B2 | 9/2009 | Breed | |
| 8,336,909 B2 * | 12/2012 | Lee ....................... | B60R 21/207 280/730.1 |
| 9,352,839 B2 | 5/2016 | Gehret et al. | |
| 9,487,177 B2 * | 11/2016 | Schneider ............. | B60R 21/231 |
| 9,682,662 B2 * | 6/2017 | Vinton ................... | B60N 2/42 |
| 10,035,484 B2 | 7/2018 | Jaradi et al. | |
| 10,471,920 B2 | 11/2019 | Dry et al. | |
| 10,703,319 B2 | 7/2020 | Schneider | |
| 10,946,826 B2 * | 3/2021 | Jaradi ................... | B60R 21/264 |
| 2013/0341975 A1 | 12/2013 | Schneider et al. | |
| 2019/0077356 A1 | 3/2019 | Patel et al. | |
| 2020/0023801 A1 | 1/2020 | Takemura et al. | |
| 2020/0172039 A1 * | 6/2020 | Ghannam ........... | B60R 21/2035 |

FOREIGN PATENT DOCUMENTS

| KR | 1020200038393 A | 4/2020 |
|---|---|---|
| NL | 1020975 C2 | 1/2004 |

* cited by examiner

*Primary Examiner* — Paul N Dickson
*Assistant Examiner* — Tiffany L Webb
(74) *Attorney, Agent, or Firm* — Frank A. MacKenzie; Bejin Bieneman PLC

(57) ABSTRACT

An assembly includes a seatback and a head restraint supported by the seatback. The assembly includes a panel slidably engaged with the seatback. The panel is movable relative to the head restraint to a deployed position rearward of the head restraint. The assembly includes an airbag supported by the panel and inflatable forward toward the head restraint.

17 Claims, 10 Drawing Sheets

US 11,358,554 B1

AIRBAG ASSEMBLY INFLATABLE FROM SEATBACK

BACKGROUND

A vehicle may include one or more airbags deployable during a vehicle impact to control kinematics of occupants inside the vehicle during the vehicle impact. The airbag may be a component of an assembly including a panel supporting the airbag, and an inflation device in communication with the airbag for inflating the airbag from an uninflated position to an inflated position.

DETAILED DESCRIPTION

Figure 1A:
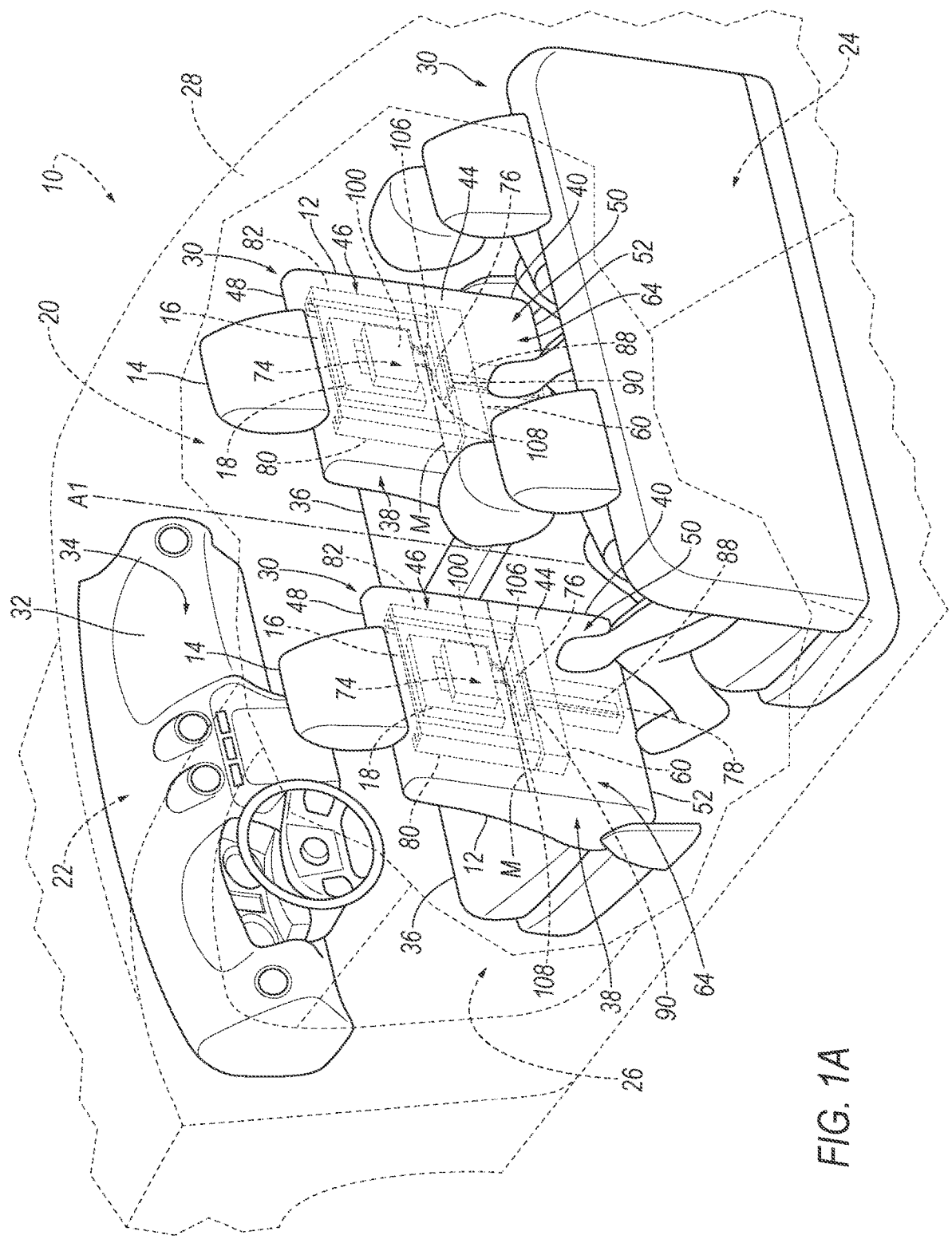
FIG. 1A is a perspective view of a vehicle including a seat with a panel assembly in the undeployed position.

An assembly includes a seatback and a head restraint supported by the seatback. The assembly includes a panel slidably engaged with the seatback. The panel is movable relative to the head restraint to a deployed position rearward of the head restraint. The assembly includes an airbag supported by the panel and inflatable forward toward the head restraint.

The assembly may include an inflator supported on the panel and in fluid communication with the airbag.

The assembly may include a second airbag supported by the panel and inflatable rearwardly from the panel.

The inflator may be in fluid communication with the airbag and the second airbag.

The airbag in the inflated position may have an upper segment above the head and two side sections extending downwardly from the upper segment along the head restraint.

The assembly may include a track fixed to the seatback. The panel may be slideably engaged with the track.

The assembly may include a pyrotechnic actuator fixed to the seatback and operatively engaged with the panel.

The pyrotechnic actuator may be below the panel.

The panel and the track may include a spring-loaded pin biased toward the other of the panel and the track, and the other of the panel and the track may include a hole configured to receive the spring-loaded pin when the panel is in the deployed position.

The panel may be planar.

The seatback may include a covering that conceals the panel when the panel is in the undeployed position.

The assembly may include a computer having a processor and a memory storing instructions executable by the processor to activate a pyrotechnic actuator to move the panel to the deployed position and, after actuating the pyrotechnic actuator, activating an inflator to the inflate the airbag to the inflated position.

An assembly includes a panel having a front side and a rear side. The assembly includes a first track and a second track spaced from each other. The first track and the second track are elongated from a first end to a second end. The panel is slidable from an undeployed position to a deployed position between the first track and the second track. The panel is slidable parallel to the elongation of the first track and the second track. The first airbag and the second airbag are inflatable to an inflated position. The first airbag is supported by the panel on the front side and the second airbag is supported by the panel on the rear side.

The assembly may include an inflator supported on the panel. The inflator may be in fluid communication with the first airbag and the second airbag.

The first airbag in the inflated position may have an upper segment extending between the first track and the second track and two side sections extending downwardly from the upper segment parallel to the first track and the second track.

The assembly may include a cross-beam and a pyrotechnic actuator operatively engaged with the panel.

One of the panel and the first track or the second track may include a spring-loaded pin biased toward the other of the panel and the first track or the second track, and the other of the panel and the first track or the second track may include a hole configured to receive the spring-loaded pin when the panel is in the deployed position.

The panel may be planar.

With reference to the Figures, wherein like numerals indicate like parts throughout the several views, an assembly for a vehicle 10 is generally shown. The assembly includes a seatback 12 and a head restraint 14 supported by the seatback 12. The assembly includes a panel 16 slidably engaged with the seatback 12. The panel 16 is movable relative to the head restraint 14 to a deployed position rearward of the head restraint 14. The assembly includes an airbag 18 supported by the panel 16 and inflatable forward toward the head restraint 14.

When the occupant is urged in a direction toward the seatback 12, the movement of the occupant is restrained by the seatback 12 and the head restraint 14. In a vehicle collision, the panel 16 is deployed to the deployed position rearward of the head restraint 14. The airbag 18 inflates toward the occupant to augment the kinematic control of the head restraint 14. Specifically, the airbag 18 inflates to control the kinematics of the head of the occupant regardless of the position of the head restraint 14.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from the driver, i.e., the vehicle 10 may be self-driving without human input.

The vehicle 10 defines a passenger cabin 20 to house occupants, if any, of the vehicle 10. The vehicle 10 includes a floor 26 and may include a roof 28 spaced from the floor 26. The roof 28 may define an upper boundary of the passenger cabin 20 and the floor 26 may define a lower boundary of the passenger cabin 20.

The floor 26 may be designed to support one or more seats 30. The seats 30 may be arranged in the passenger cabin 20 in any suitable position, i.e., as front seats, rear seats, third-row seats, etc. The seats 30 may be movable relative to the floor 26 to various positions, e.g., movable fore-and-aft and/or cross-vehicle, rotatable about a vertical axis A1 extending through the floor 26, etc. The seats 30 may be of any suitable type, e.g., a bucket seat as shown in the Figures.

The vehicle 10 includes an instrument panel 32. The instrument panel 32 may be disposed at the front end 22 of the passenger cabin 20 as shown in the Figures. The instrument panel 32 may extend across the passenger cabin 20 in the cross-vehicle direction. The instrument panel 32 may have a vehicle-rearward face 34. The vehicle-rearward face 34 may extend downwardly to the floor 26.

The instrument panel 32 may include one or more vehicle controls, such as gauges, dials, screens, and information displays; heating and ventilation equipment; a radio and other electronics, etc. The instrument panel 32 may include a steering wheel. In an example where the vehicle 10 is an autonomous vehicle, the instrument panel 32 may lack a steering wheel. In other words, no steering wheel is supported by the instrument panel 32.

As set forth above, the vehicle 10 includes one or more seats. Any or all or the seats 30 of the vehicle 10 may include the panel 16 and the airbag 18 supported by the panel 16. In the example shown in FIG. 1B, two seats, specifically two front seats, each include the panel 16 and the airbag 18 supported by the panel 16. Common numerals are used to identify common features of the seats 30.

The seat 30 may include the seatback 12 and a seat bottom 36. The seatback 12 may be supported by the seat bottom 36 and may be stationary or movable relative to the seat bottom 36. The seatback 12 and the seat bottom 36 may be adjustable in multiple degrees of freedom. Specifically, the seatback 12 and the seat bottom 36 may themselves be adjustable. In other words, adjustable components within the seatback 12 and the seat bottom 36 may be adjustable relative to each other.

Figure 1B:
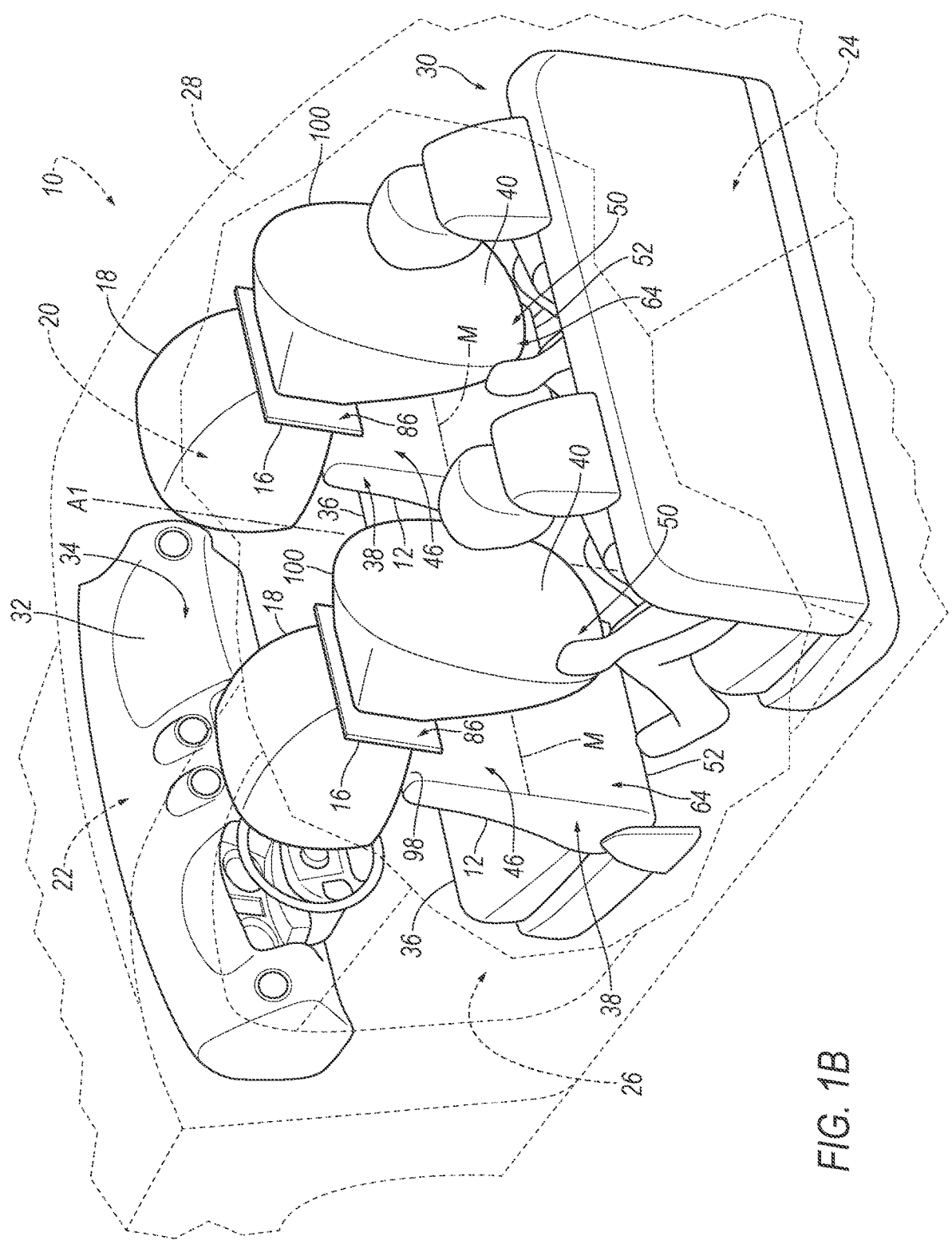
FIG. 1B is a perspective view of the vehicle including the panel assembly in the deployed position.

The seatback 12 includes a first side 38 and a second side 40 spaced from each other in a cross-seat direction, e.g., in a cross-vehicle direction when the seat 30 is forward-facing. The seat 30 includes a front 42 extending between the first side 38 and the second side 40 and a rear 44 extending between the first side 38 and the second side 40. As shown in FIGS. 1A-1B, when the seat 30 is forward-facing, the front 42 of the seat 30 faces vehicle-forward and the rear 44 of the seat 30 faces vehicle-rearward. Similarly, when the seat 30 is rearward-facing, the front 42 of the seat 30 faces vehicle-rearward and the rear 44 of the seat 30 faces vehicle-forward. The seatback 12 includes a midline M extending from the first side 38 to the second side 40. Specifically, the midline M is horizontal. The seatback 12 includes a top portion 46 and a top end 48. The top portion 46 extends upwardly from the midline M and terminates at the top end 48. The seatback 12 includes a bottom portion 50 and a bottom end 52. The bottom portion 50 extends downwardly from the midline M and terminates at the bottom end 52. The top side of the seatback 12 is above the midline M and the bottom side of the seatback 12 is below the midline M. As an example shown in the Figures, the first side 38 and the second side 40 may terminate at the top end 48 and the bottom end 52.

The seat 30 includes a frame. For example, the seat 30 may include a seatback frame 54 and a seat bottom frame (not shown). The seatback frame 54 and the seat bottom frame may be separate and attached to each other or may be unitary.

The seatback 12 may include the seatback frame 54. The seatback frame 54 may include tubes, beams, etc. Specifically, the seatback frame 54 may include a first upright frame member 56, a second upright frame member 58, a first cross-beam 60, and a second cross-beam 62. The first upright frame member 56 or the second upright frame member 58 may be on the first side 38 of the seatback 12 and the other of the first upright frame member 56 or the second upright frame member 58 may be on the second side 40 of the seatback 12. In the examples shown in the Figures, the first upright frame member 56 is on the first side 38 of the seatback 12 and the second upright frame member 58 is on the second side 40 of the seatback 12.

The first cross-beam 60 and the second cross-beam 62 are spaced from each other. The first cross-beam 60 or the second cross-beam 62 may be nearer the midline M and the other of the first cross-beam 60 or the second cross-beam 62 may be nearer the top side of the seatback 12. In the examples shown in the Figures, the first cross-beam 60 is nearer the midline M and the second cross-beam 62 is nearer the top side of the seatback 12. The first cross-beam 60 and the second cross-beam 62 each extend from the first upright frame member 56 to the second upright frame member 58.

The seatback frame 54 may be of any suitable material, e.g., carbon fiber reinforced plastic (CFRP), glass fiber reinforced semi-finished thermoplastic composite (organosheet), etc. As another example, some or all components of the seatback frame 54 may be a suitable metal, e.g., a steel, aluminum, etc.

The seat bottom 36 may include the seat bottom frame, not shown in the Figures. The seat bottom frame may include tubes, beams, etc. The seat bottom frame may be of any suitable plastic material, e.g., carbon fiber reinforced plastic (CFRP), glass fiber reinforced semi-finished thermoplastic composite (organosheet), etc. As another example, some or all components of the seat bottom frame may be of a suitable material, e.g., a steel, aluminum, etc.

The seat 30 includes one or more coverings 64. Specifically, the seat bottom 36 and/or the seatback 12 may each include the covering. For example, the seatback 12 may include the covering 64 supported on the seatback frame 54. The covering 64 on may include upholstery and padding. The upholstery may be cloth, faux leather, or any other suitable material. The upholstery may be stitched in panels around the frame. The padding may be between the covering 64 and the seatback frame 54 and may be foam or any other suitable material.

The covering 64 may conceal the panel 16 when the panel 16 is in an undeployed position. In other words, when the panel 16 is in the undeployed position, the panel 16 is not visible to the occupant. When the panel 16 moves from the undeployed position to the deployed position, the panel 16 extends through the covering. For example, the covering 64 may include a tear seam 66 through which the panel 16 extends as the panel 16 moves from the undeployed position to the deployed position. As one example, the covering 64 may include trim 68 through which the panel 16 extends in the deployed position. The trim 68 may be, for example, plastic, and may include the tear seam 66.

The head restraint 14 is supported by the seatback 12. The head restraint 14 may be supported by the top portion 46 of the seatback 12, e.g., at the top end 48. Specifically, the head restraint 14 may be supported by the second cross-beam 62. As shown in the Figures, the head restraint 14 may have at least one support post 70. The support post 70 may be connected to the second cross-beam 62. The head restraint 14 may be adjustable. Specifically, the support post 70 may be slidably connected to the second cross-beam 62. In other words, the head restraint 14 may be slidable up and down relative to the second cross-beam 62.

Figure 3:
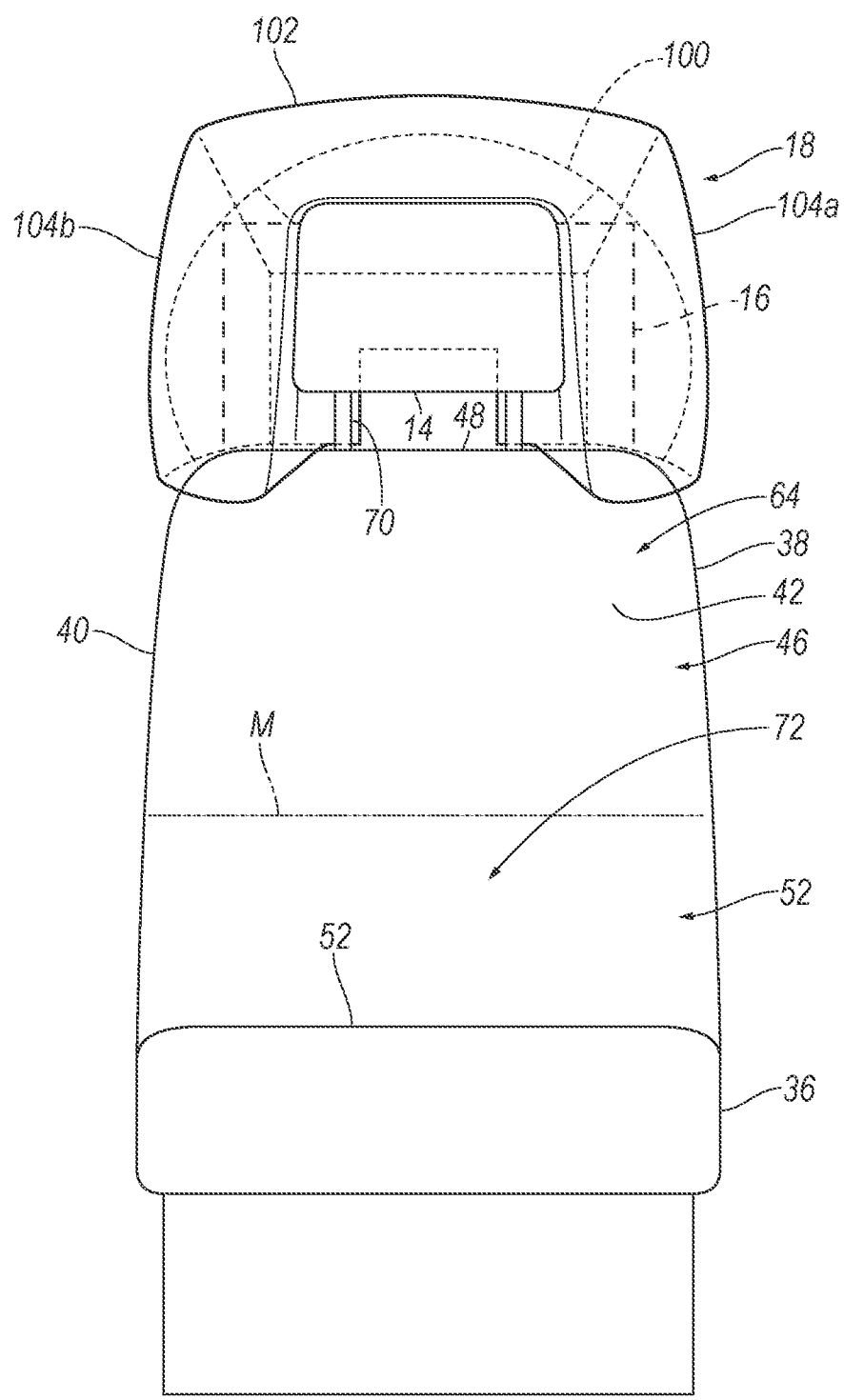
FIG. 3 is a front view of the seat with the panel assembly in the deployed position and the first airbag and the second airbag in the inflated position.

The seat 30 may define an occupant seating area 72. As one example, as shown in the Figures, the seatback 12 may define the occupant seating area 72. Specifically, the seatback 12 may define the occupant seating area 72 on the front 42 of the seatback 12 between the first side 38 and the second side 40. As shown in FIG. 3, the occupant seating area 72 is on the front 42 of the seatback 12 and above the seat bottom 36. In other words, when the occupant occupies the seat, the occupant is in the occupant seating area 72.

The vehicle 10 includes a panel assembly 74. The panel assembly 74 includes the panel 16, the airbag 18, and an inflator 76. The panel assembly 74 may include a second airbag 100, a track 80, 82, and an actuator 78 to move the panel 16. The actuator 78 may be any suitable type, for example, a pyrotechnic actuator. In the example shown in the Figures, during a vehicle collision, the pyrotechnic actuator moves the panel 16 upwardly along the track 80, 82 from the undeployed position to the deployed position. The airbag 18 is inflated toward the occupant seating area 72 to control the kinematics of the occupant. The positioning of the airbag 18 is independent of the head restraint 14. In examples including the second airbag 100, the second airbag 100 is inflatable away from the head restraint 14 and, for example, toward an occupant, if any, in the rear of the passenger cabin 20, when the seat 30 is forward-facing. As another example, the second airbag 100 is inflatable toward the instrument panel 32 when the seat 30 is rearward-facing.

As discussed above, the panel 16 is movable from the undeployed position to the deployed position. As shown in the Figures, the panel 16 is moveable relative to the head restraint 14. Specifically, the panel 16 is movable from the undeployed position to the deployed position relative to the head restraint 14. Specifically, the panel 16 is slideably engaged with the seatback 12. As an example shown in the Figures, the panel assembly 74 includes the track 80, 82 and the panel 16 is slideably engaged with the track 80, 82. The track 80, 82 may be elongated along the longitudinal axis of the seatback 12. In such an example, the panel 16 moves parallel to the elongate of the track 80, 82 from the undeployed position. The track 80, 82 may be elongated in a substantially upright position when the seatback 12 is upright. In this example, as shown in FIGS. 2A-2C the panel 16 slides upwardly along the track 80, 82 from the undeployed position to the deployed position.

Figure 2A:
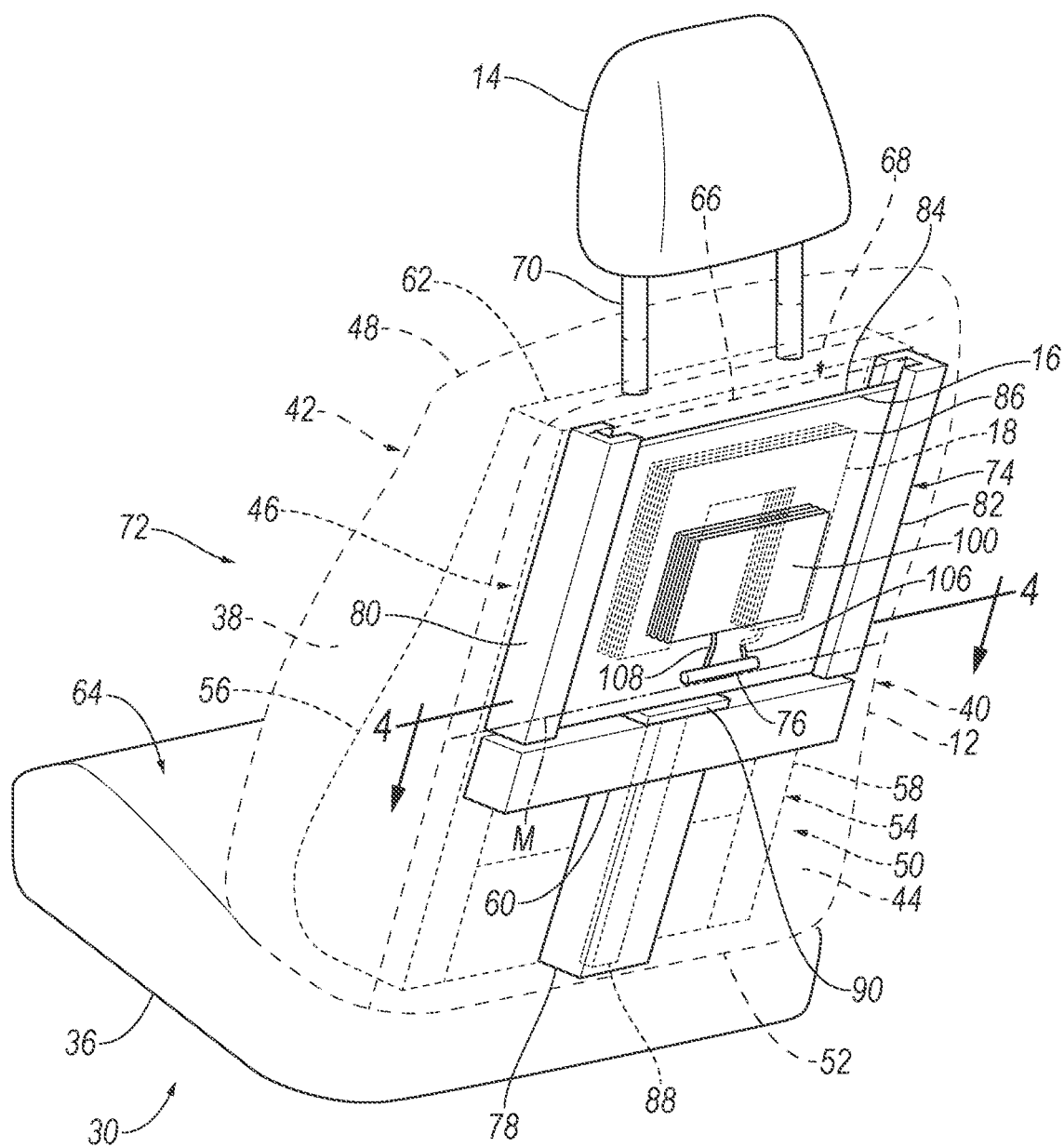
FIG. 2A is a perspective view of the seat with the panel assembly in the undeployed position.
Figure 2B:
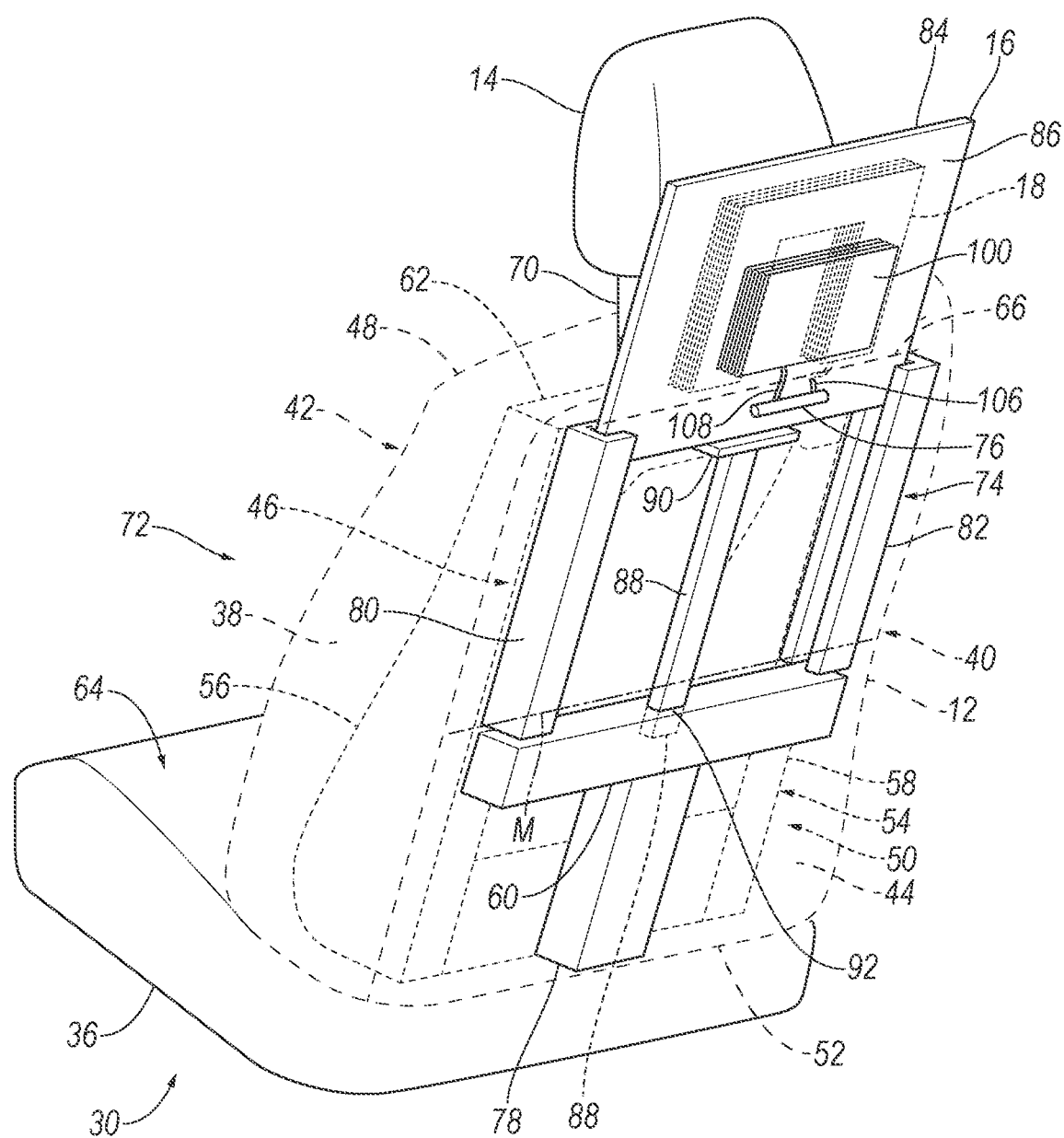
FIG. 2B is a perspective view of the seat with the panel assembly in the deployed position and a first airbag and a second airbag in the uninflated position.
Figure 2C:
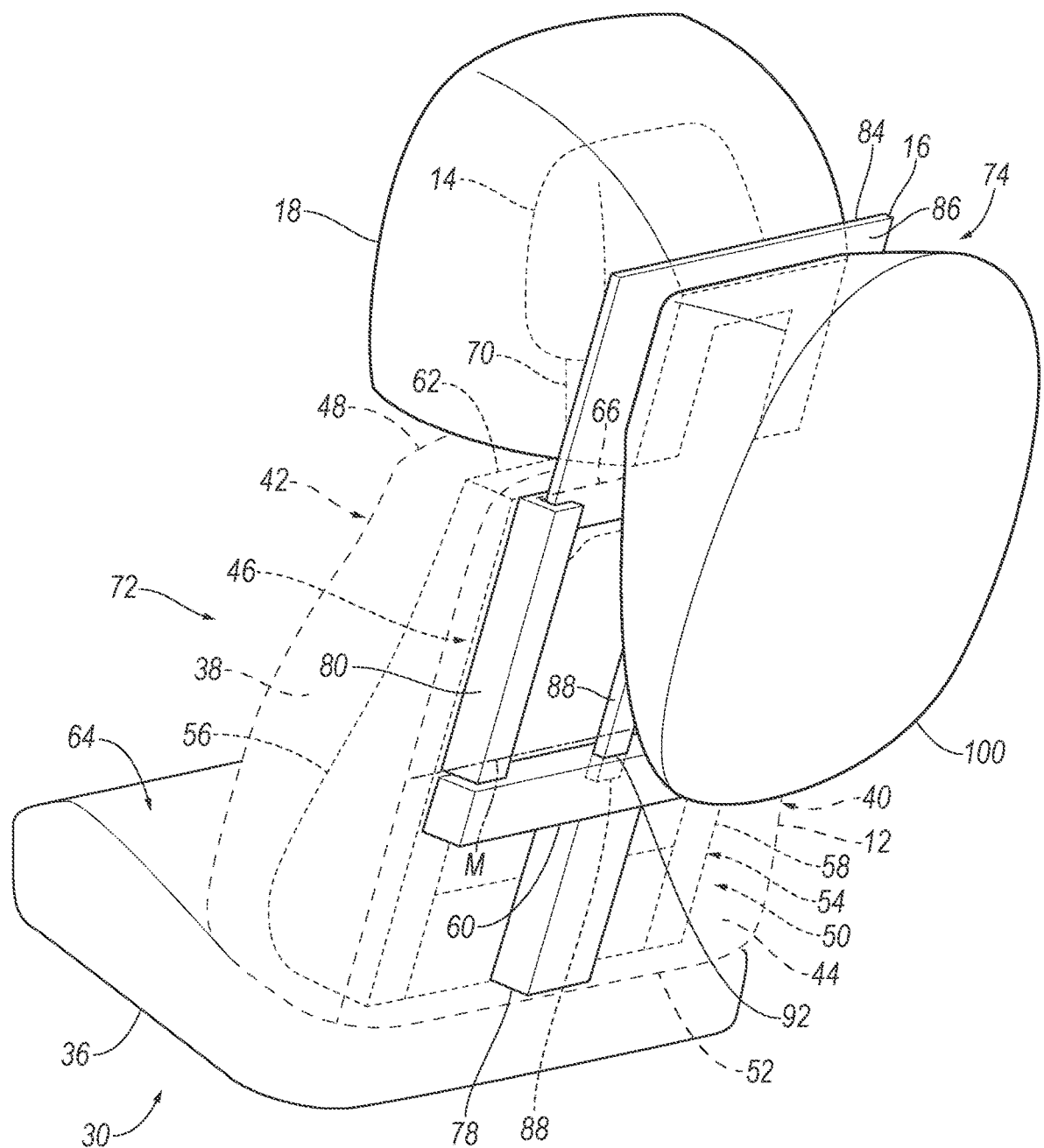
FIG. 2C is a perspective view of the seat with panel assembly in the deployed position and the first airbag and the second airbag in the inflated position.

With continued reference to FIGS. 2A-2C, the track 80, 82 is supported by the seatback 12 and may move as a unit with the seatback 12. Specifically, the track 80, 82 may be fixed to the seatback 12 directly or indirectly, i.e., through an intermediate component. Specifically, the track 80, 82 may be fixed to the seatback frame 54. The panel assembly 74 may include two tracks 80, 82, i.e., a first track 80 and a second track 82, spaced from each other. As shown in the Figures, one of the tracks 80, 82 may be fixed to the first upright frame member 56 and the other of the tracks 80, 82 may be fixed to the second upright frame member 58. In the example including two tracks 80, 82, the panel 16 may extend from one of the tracks 80, 82 to the other of the tracks 80, 82. In such an example, the panel 16 moves parallel to the elongation of the two tracks 80, 82.

Figure 4:
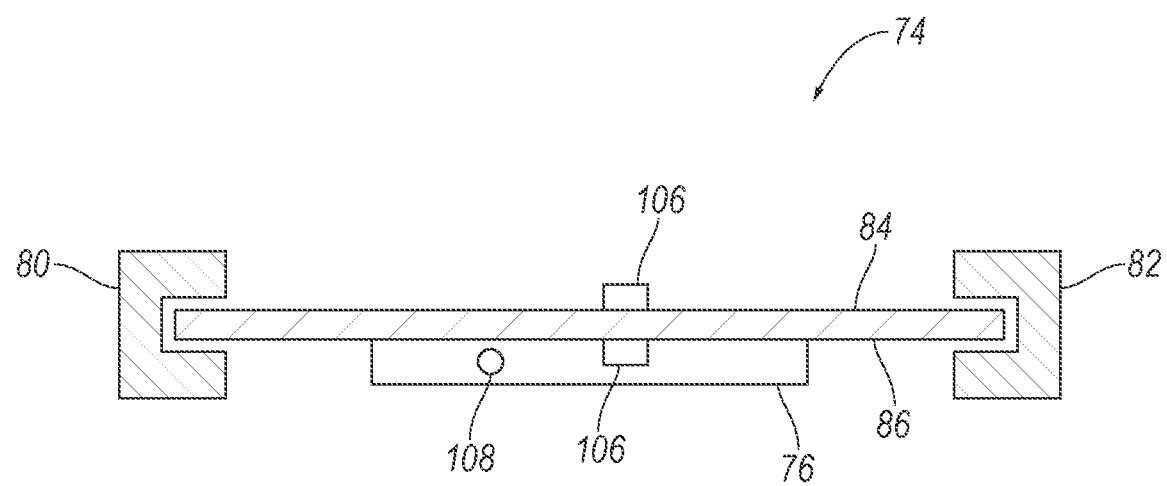
FIG. 4 is a cross-section view of the panel assembly in FIG. 2A.
Figure 5:
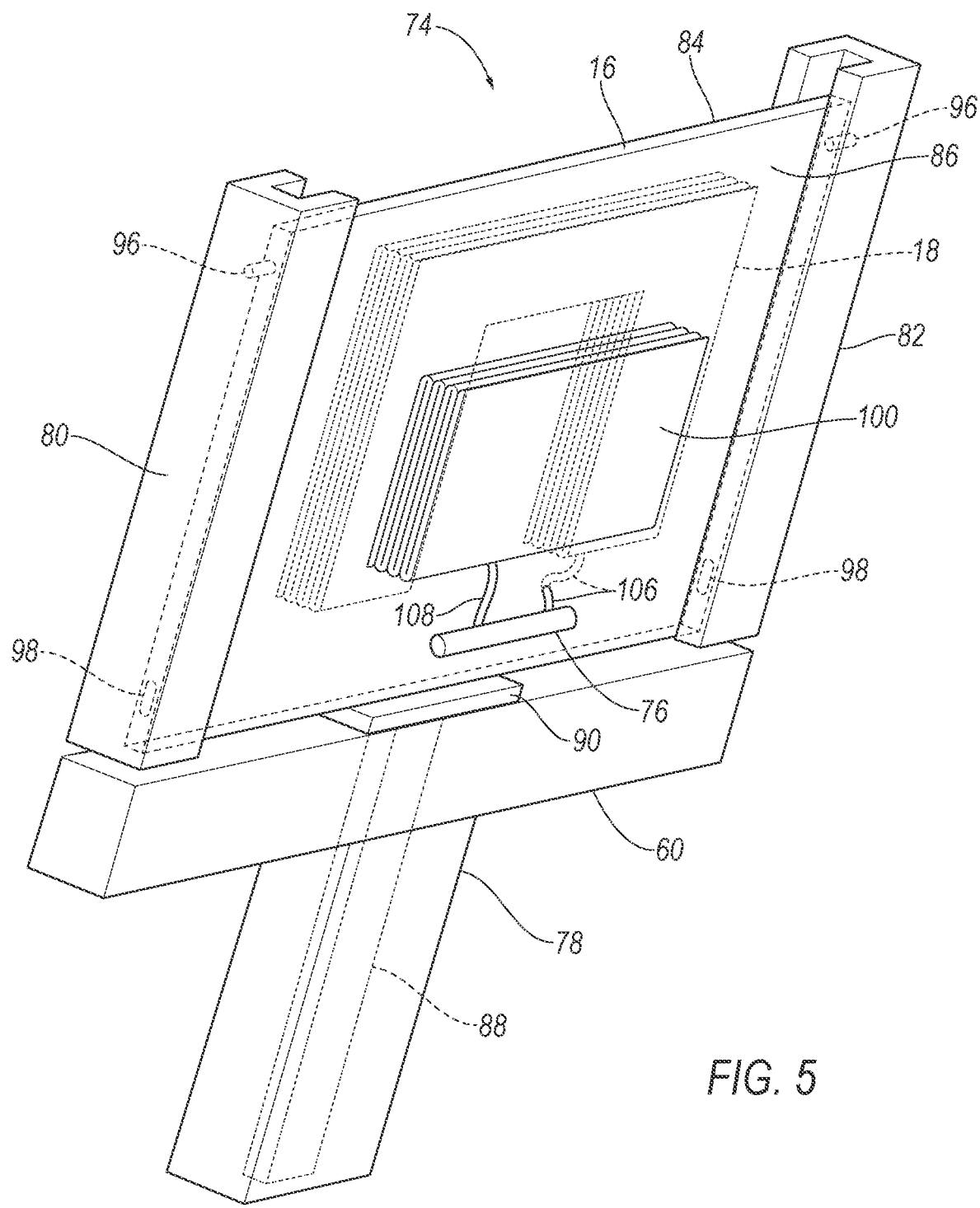
FIG. 5 is a perspective view of the panel assembly isolated from the seat.

As mentioned above, the panel 16 may be slideably engaged with the track 80, 82. In other words, when the panel 16 moves from the undeployed position to the deployed position, the panel 16 slides along the track 80, 82. As an example shown in FIG. 4, the first track 80 and the second track 82 define slots and the panel 16 is slideably engaged with the slots.

The panel 16 may be planar. The panel 16 is rigid relative to the airbag 18 and the second airbag 100. Specifically, the panel 16 acts as a reaction surface for the airbag 18 and the second airbag 100 in the inflated position. The panel 16 has a front side 84 and a rear side 86. The front side 84 faces vehicle-forward when the seat 30 is forward-facing, and the rear side 86 faces vehicle-rearward when the seat 30 is rearward-facing. The panel 16 may be of any suitable material, e.g., plastic such as carbon fiber reinforced plastic (CFRP), glass fiber reinforced semi-finished thermoplastic composite (organosheet), etc.; metal such as steel, aluminum, etc.; or any other suitable material.

The assembly includes the actuator 78 that moves the panel 16 from the undeployed position to the deployed position. As an example, the assembly may include the pyrotechnic actuator 78. The pyrotechnic actuator 78 may be supported by the seatback 12 and may move as a unit with the seatback 12. Specifically, the track 80, 82 may be fixed to the seatback 12 directly or indirectly, i.e., through an intermediate component. The pyrotechnic actuator 78 may be fixed to the seatback 12 at any suitable point on the seatback 12. As an example shown in the Figures, the pyrotechnic actuator 78 is fixed to the seatback 12 below the panel 16. In this example, the pyrotechnic actuator 78 is fixed to the seatback frame 54. Specifically, the pyrotechnic actuator 78 is positioned on the first cross-beam 60.

The pyrotechnic actuator 78 may be operatively engaged with the panel 16. When the pyrotechnic actuator 78 is activated, as described below, the pyrotechnic actuator 78 moves the panel 16 from the undeployed position to the deployed position. For example, as shown in FIGS. 2B-2C, the pyrotechnic actuator 78 may include a pyrotechnic charge (not shown) and a piston 88 having a first end 90 and a second end 92. The pyrotechnic actuator 78, including the piston 88, is shown schematically in FIGS. 2B-2C. The first end 90 of the piston 88 is directly or indirectly engaged with the pyrotechnic charge. The second end 92 of the piston 88 is directly or indirectly engaged with panel. Specifically, the piston 88 is engaged with the bottom of the panel 16. In a vehicle collision, the pyrotechnic charge drives the piston 88 upward, moving the panel 16 from the undeployed position to the deployed position. In other words, the pyrotechnic actuator 78 is operatively engaged with the panel 16 via the linear movement of the piston 88.

In other examples, the pyrotechnic actuator 78 may include a rotary spool. The panel assembly 74 may include a chain having a first end directly or indirectly engaged with the rotary spool and a second end connected directly or indirectly to the panel 16. In this example, the pyrotechnic actuator 78 may be connected to the seatback frame 54 at any suitable location, e.g., the first cross-beam 60, the second cross-beam 62, etc., and the chain. In a vehicle collision, the pyrotechnic charge rotates the rotary spool and retracting the chain. When the chain is retracted, the chain pulls the panel 16 upwardly from the undeployed position to the deployed position.

The panel assembly 74 may include a locking assembly to lock the panel 16 in the deployed position. In other words, the locking assembly prevents upward and/or downward movement of the panel 16 when the panel 16 is in the deployed position. The locking assembly may include a spring-loaded pin 96 and a hole 98. Specifically, one of the panel 16 and the track 80, 82 includes the spring-loaded pin 96 biased toward the other of the panel 16 and the track 80, 82, and the other of the panel 16 and the track 80, 82 includes the hole 98 configured (e.g., sized, shaped, and positioned) to receive the spring-loaded pin 96 when the panel 16 is in the deployed position. As an example shown in the Figures, the track 80, 82 includes the spring-loaded pin 96 biased toward panel and the panel 16 includes the hole 98 configured to receive the spring-loaded pin 96 when the panel 16 is in the deployed position. In other words, the hole 98 is positioned on the panel 16 to receive the spring-loaded pin 96 and the hole 98 has a diameter not less than the spring-loaded pin 96. The hole 98 and the spring-loaded pin 96 are positioned at any suitable location on the track 80, 82 and the panel 16 that positions the panel 16 in the deployed position.

In the deployed position, the panel 16 is seat-rearward of the head restraint 14. For example, the panel 16 is vehicle-rearward of the head restraint 14 when the seat 30 is forward-facing. As another example, when the seat 30 is rearward-facing, the panel 16 is vehicle-forward of the head restraint 14. In other words, in the deployed position, the head restraint 14 is between the panel 16 and the occupant seating area 72.

The panel assembly 74 includes the airbag 18 supported by the panel 16 and inflatable to an inflated position. The panel assembly 74 may include a second airbag 100 supported by the panel 16 and inflatable to an inflated position. In an example including the second airbag 100, the airbag 18 is inflatable forward toward the head restraint 14 and the second airbag 100 is inflatable rearwardly from the panel 16. In other words, the airbag 18 and the second airbag 100 are inflatable in opposite directions from the panel 16.

The airbag 18 is supported by the panel 16. In other words, the airbag 18 moves as a unit with the panel 16 as the panel 16 moves from the undeployed position to the deployed position. In examples including the second airbag 100, the second airbag 100 is supported by the panel 16. The airbag 18 may be mounted directly to the panel 16, and in examples including the second airbag 100, the second airbag 100 may be mounted directly to the panel 16.

As set forth above, the airbag 18 is inflatable forward toward the head restraint 14. In other words, the airbag 18 deploys in the direction the occupant seating area 72. In the inflated position, the airbag 18 may partially surround a portion of the occupant seating area 72.

The airbag 18 may include multiple segments. Specifically, as an example shown in the Figures, the airbag 18 includes an upper segment 102 above the head restraint 14 and two side sections 104a, 104b extending downwardly from the upper segment 102 along the head restraint 14. As shown in the Figures, the upper segment 102 extends forward from the panel 16 above the head restraint 14 toward the front end 22 of the passenger cabin 20 when the seat 30 is forward-facing. In the inflated position, the upper segment 102 extends over an occupant in the occupant seating area 72. The first side section 104a extends forward from the panel 16 along the head restraint 14 above the first side 38 of the seat back. In the inflated position the first side section 104a extends downwardly toward the midline M along the front 42 of the seatback 12 and extends forward toward the instrument panel 32. The second side section 104b extends forward from the panel 16 along the head restraint 14 above the second side of the seatback 12. In the inflated position the second side section 104b extends downwardly toward the midline M along the front 42 of the seatback 12 and extends forward toward the front end 22 of the passenger cabin 20.

The airbag 18 includes at least one inflation chamber. During inflation of the airbag 18 from the uninflated position to the inflated position, the inflation chamber is filled with an inflation medium, described further below. Specifically, the upper segment 102, the first side section 104a, and the second side section 104b may each define an inflation chamber, respectively. Alternatively, the upper segment 102, the first side section 104a and the second side section 104b may share the inflation chamber. In other words, the inflation chamber is common to the upper segment 102, the first side section 104a and the second side section 104b. In this example, the airbag 18 may be unitary, i.e., the airbag 18 is a single, uniform piece of material with no seams, joints, fasteners, or adhesives, e.g., is one-piece woven. The airbag 18 may include internal tethers, i.e., within the inflation chamber, to control deployment of the upper segment 102, the first side section 104a, and the second side section 104b.

As set forth above, the second airbag 100 is inflatable rearwardly from the panel 16. In other words, as shown in the Figures, when the seat 30 is forward-facing the second airbag 100 deploys toward the rear end 24 of the passenger cabin 20. The second airbag 100 includes an inflation chamber. During the inflation of the second airbag 100 from the uninflated position to the inflated position, the inflation chamber is filled with the inflation medium.

As discussed above, the seat 30 is rotatable. In an example where the seat 30 is rearward-facing, the second airbag 100 is inflatable toward the instrument panel 32. In this example, the inflation of the second airbag 100 may be different based on the direction of the seat. For example, the second airbag 100 may be inflated to a first pressure when the seat 30 is forward facing and the inflation of the second airbag 100 may be controlled to be a second pressure less than the first pressure when the seat is rearward facing. For example, when the seat 30 is rearward facing the second airbag 100 may be inflated to a second pressure greater than zero and less than the first pressure. In another example, when the seat 30 is rearward facing, the second airbag 100 may not be inflated, i.e., the second pressure is zero.

The airbag 18 and the second airbag 100 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The panel assembly 74 includes the inflator 76. The inflator 76 may be supported on the panel 16. In other words, the inflator 76 may move with the panel 16 as the panel 16 moves from the undeployed position to the deployed position. As shown in the Figures, the inflator 76 may be supported on the rear side 86 of the panel 16. In another example, the inflator 76 may be supported on the front side 84 of the panel 16. In another example, not shown in the Figures, the inflator 76 may be supported on the seatback frame 54. Specifically, the inflator 76 may be supported on the first cross-beam 60.

The inflator 76 may be in fluid communication with the airbag 18 and the second airbag 100. As another example, the panel assembly 74 may include more than one inflator 76 with at least one inflator 76 dedicated to the airbag 18 and at least one other inflator 76 dedicated to the second airbag 100. The inflator 76 expands the airbag 18 and the second airbag 100 with the inflation medium, such as a gas, to move the airbag 18 from the uninflated position to the inflated position.

The inflator 76 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 76 may be, for example, connected to the inflation chamber via fill tubes or may be at least partially in the inflation chamber to deliver the inflation medium directly to the inflation chamber.

In the example in which the inflator 76 is in fluid communication with the airbag 18 and the second airbag 100, the panel assembly 74 may include a first fill tube 106 and a second fill tube 108. The first fill tube 106 connects the inflator 76 and the airbag 18. The second fill tube 108 connects the inflator 76 and the second airbag 100. In the example shown in FIG. 4, the first fill tube 106 passes through the panel 16 from the inflator 76 to the airbag 18. In the example where the inflator 76 is supported on the front side 84 of the panel 16, the second fill tube 108 passes through the panel 16 from the inflator 76 to the second airbag 100. In the example where the inflator 76 is supported on the seatback frame 54, the fill tubes may be longer than in the example where the inflator 76 is supported on the panel 16.

The vehicle 10 may include at least one impact sensor 110 and at least one seat position sensor 112 in communication with the inflator 76 and/or the actuator 78. The impact sensor 110 is designed to detect an impact to the vehicle 10. The inflator 76 may be activated based on detected impact. The actuator 78 may be activated based on detected impact. The impact sensor 110 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 110 may be located at numerous points in or on the vehicle 10. The seat position sensor 112 may be of any suitable type, for example, including rotation sensors, vision-sensing systems, etc. The vehicle 10 may include a computer 114 and a communications network 116. In the event of an impact, the impact sensor 110 may detect the impact and transmit a signal through the communications network 116 to the computer 114.

Figure 6:
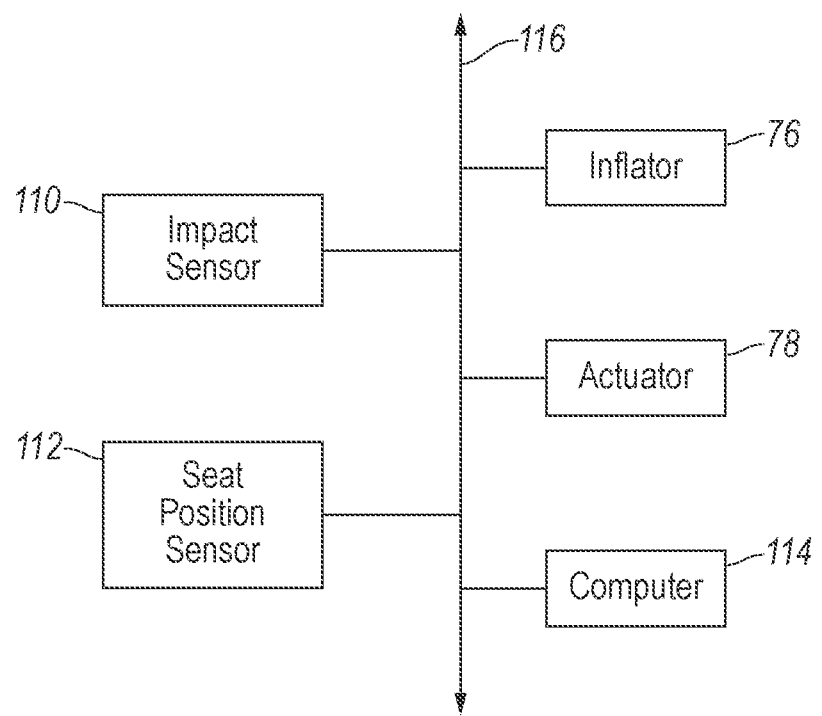
FIG. 6 is a block diagram of a communications network.

With reference to FIG. 6, the vehicle 10 may include a control system including the communications network 116 and the computer 114, e.g., an airbag control module. The communications network 116 may be a controller area network (CAN) bus, ethernet, wi-fi, local interconnect network, and/or by any other wired or wireless communications network. The computer 114 may be in communication with the impact sensor 110 and the inflator 76 and/or the actuator 78 via the communications network 116.

Figure 7:
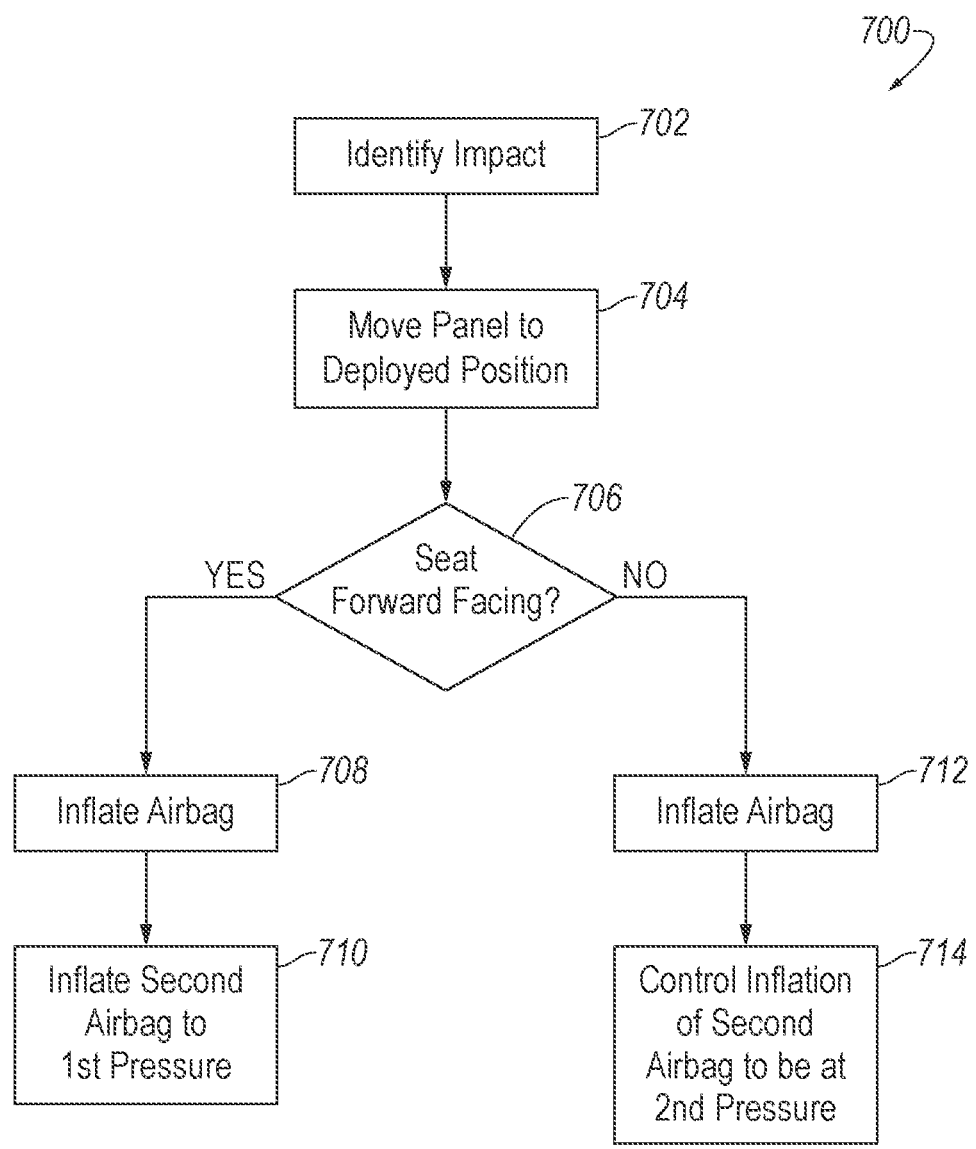
FIG. 7 is a block diagram showing a method performed by a computer of the vehicle.

The computer 114 may be a microprocessor-based controller. The computer 114 may include a processor, memory, etc. The memory of the computer 114 may store instructions executable by the processor as well as data and/or databases. The computer 114 is programmed to perform the method 700 shown in FIG. 7, i.e., the memory stores instructions executable by the processor to perform the elements of the method shown in FIG. 7.

The computer 114 may be programmed to identify an impact to the vehicle 10, as shown in block 702. For example, the computer 114 may determine that a vehicle impact has occurred based on information received from the impact sensor 110 via the communications network 116.

In response to the identification of a vehicle impact, the computer 114 is programmed to activate the actuator 78, as shown in 704 to move the panel 16 to the deployed position. This raises the panel 16 upwardly along the head restraint 14, as described above.

The computer 114 is programmed to inflate the airbag 18, as shown in blocks 708 and 712. The computer 114 may be programmed to inflate the airbag 18 similarly (e.g., same timing, pressure, etc.) in blocks 708 and 712, i.e., regardless of the position of the seat 30.

The computer 114 may be programmed to inflate the second airbag 100 based on the direction of the seat 30. Specifically, at decision block 706, the computer 114 determines whether the seat 30 is forward facing or not, e.g., whether the seat 30 is forward facing or rearward facing. With reference to block 710, if the seat 30 is forward facing in block 706, the computer 114 may be programmed to inflate the second airbag 100 to the first pressure, as described above. With reference to block 714, if the seat 30 is not forward facing in block 706, e.g., the seat 30 is rearward facing, the computer 114 may be programmed to control inflation of the second airbag 100 to be at the second pressure, as described above. For example, in block 714, the second airbag 100 may be inflated to a second pressure greater than zero and less than the first inflation pressure of the airbag 18. As another example, the second airbag 100 may not be inflated, i.e., the computer controls the inflation of the second airbag 100 to not inflate the second airbag 100.

Computing devices, such as the computer 114, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by the computer 114 (e.g., by a processor of the computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer 114 can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Use of "in response to," "based on," and "upon determining" herein indicates a causal relationship, not merely a temporal relationship. The adjectives "first," "second," etc., are used herein merely as identifiers and are not used to identify order or importance. Many modifications and variations of the present disclosure are possible in light of the above teachings, and the disclosure may be practiced otherwise than as specifically described.

What is claimed is:

1. An assembly comprising:
a seatback;
a head restraint supported by the seatback;
a panel slideably engaged with the seatback and moveable relative to the head restraint to a deployed position rearward of the head restraint;
an airbag supported by the panel and inflatable forward toward the head restraint; and
an inflator in fluid communication with the airbag, the inflator being supported on the panel and moveable with the panel to the deployed position.

2. The assembly as set forth in claim 1, further comprising a second airbag supported by the panel and inflatable rearwardly from the panel.

3. The assembly as set forth in claim 2, wherein the inflator is in fluid communication with the second airbag.

4. The assembly as set forth in claim 1, wherein the airbag in the inflated position has an upper segment above the head restraint and two side sections extending downwardly from the upper segment along the head restraint.

5. The assembly as set forth in claim 1, further comprising a track fixed to the seatback, the panel being slideably engaged with the track.

6. The assembly as set forth in claim 5, further comprising a pyrotechnic actuator fixed to the seatback and operatively engaged with the panel.

7. The assembly as set forth in claim 6, wherein the pyrotechnic actuator is below the panel.

8. The assembly as set forth in claim 5, wherein one of the panel and the track includes a spring-loaded pin biased toward the other of the panel and the track, and the other of the panel and the track including a hole configured to receive the spring-loaded pin when the panel is in the deployed position.

9. The assembly as set forth in claim 1, wherein the panel is planar.

10. The assembly as set forth in claim 1, wherein the seatback includes a covering that conceals the panel when the panel is in an undeployed position.

11. The assembly of claim 1, further comprising a computer having a processor and a memory storing instructions executable by the processor to activate a pyrotechnic actuator to move the panel to the deployed position and, after actuating the pyrotechnic actuator, activating an inflator to inflate the airbag to the inflated position.

12. An assembly comprising:
a panel having a front side and a rear side;
a first track and a second track spaced from each other;
the first track and the second track elongated from a first end to a second end;
the panel slidable from an undeployed position to a deployed position between the first track and the second track along the first track and the second track;
a first airbag and a second airbag inflatable to an inflated position;
the first airbag supported by the panel on the front side and the second airbag supported by the panel on the rear side;
an inflator in fluid communication with the first airbag and the second airbag; and
the inflator being supported on the panel and moveable with the panel to the deployed position.

13. The assembly of claim 12, wherein the first airbag in the inflated position has an upper segment extending between the first track and the second track and two side sections extending downwardly from the upper segment.

14. The assembly of claim 12, further comprising a cross-beam and a pyrotechnic actuator operatively engaged with the panel.

15. The assembly of claim 12, wherein one of the panel and the first track or the second track includes a spring-loaded pin biased toward the other of the panel and the first track or the second track, and the other of the panel and the first track or the second track including a hole configured to receive the spring-loaded pin when the panel is in the deployed position.

16. The assembly of claim 12, wherein the panel is planar.

17. An assembly comprising:
a seatback;
a head restraint supported by the seatback;
a panel slideably engaged with the seatback and moveable relative to the head restraint to a deployed position rearward of the head restraint;
an airbag supported by the panel and inflatable forward toward the head restraint; and
a computer having a processor and a memory storing instructions executable by the processor to activate a pyrotechnic actuator to move the panel to the deployed position and, after actuating the pyrotechnic actuator, activating an inflator to inflate the airbag to the inflated position.

* * * * *